(12) United States Patent
Lerch et al.

(10) Patent No.: US 12,179,279 B2
(45) Date of Patent: Dec. 31, 2024

(54) METHOD FOR PRODUCING A JOINING CONNECTION BETWEEN METAL SHEETS

(71) Applicant: MAGNA INTERNATIONAL INC., Aurora (CA)

(72) Inventors: Jörg Lerch, Küllstedt (DE); Stephan Kaufhold, Heilbad Heiligenstadt (DE); Edward Schleichert, Sailauf (DE)

(73) Assignee: MAGNA INTERNATIONAL INC., Aurora (CA)

( * ) Notice: Subject to any disclaimer, the term of this patent is extended or adjusted under 35 U.S.C. 154(b) by 126 days.

(21) Appl. No.: 17/909,189

(22) PCT Filed: Feb. 26, 2021

(86) PCT No.: PCT/EP2021/054947
§ 371 (c)(1),
(2) Date: Sep. 2, 2022

(87) PCT Pub. No.: WO2021/175742
PCT Pub. Date: Sep. 10, 2021

(65) Prior Publication Data
US 2023/0145522 A1 May 11, 2023

(30) Foreign Application Priority Data
Mar. 4, 2020 (DE) .................. 10 2020 202 789.7

(51) Int. Cl.
*B23K 1/00* (2006.01)
*B23K 1/005* (2006.01)
(Continued)

(52) U.S. Cl.
CPC ................ *B23K 1/20* (2013.01); *B23K 1/005* (2013.01); *B23K 1/008* (2013.01); *B23K 2101/006* (2018.08); *B23K 2101/34* (2018.08)

(58) Field of Classification Search
CPC .. B23K 1/0018; B23K 2101/001; B23K 1/20; B23K 1/206; B23K 2101/35; B23P 15/04; B23P 6/002
See application file for complete search history.

(56) References Cited

U.S. PATENT DOCUMENTS 4,832,252 A * 5/1989 Fraser .................... B23P 6/005
228/232
8,640,942 B1 * 2/2014 Ozbaysal ............... B23P 6/005
228/119

(Continued)

FOREIGN PATENT DOCUMENTS

DE 102004049825 A1 * 4/2006 ........... B08B 7/0042
DE 102005038493 A1 2/2007
(Continued)

OTHER PUBLICATIONS

Computer English translation of DE-102004049825-A1 (Year: 2024).*

*Primary Examiner* — Erin B Saad
(74) *Attorney, Agent, or Firm* — Dickinson Wright PLLC

(57) ABSTRACT

A method for producing a joining connection between at least two metal sheets or at least two components made of hot-workable sheet metal with a scaling-resistant coating, is provided. The method includes at least one step in which a connection is produced between the at least two metal sheets or sheet-metal components by hot-press soldering, wherein the surface of the metal sheets or components to be connected is pretreated in order to break up the coating.

9 Claims, 3 Drawing Sheets

(51) Int. Cl.
    *B23K 1/008*     (2006.01)
    *B23K 1/20*     (2006.01)
    *B23K 101/00*     (2006.01)
    *B23K 101/34*     (2006.01)

(56) References Cited

U.S. PATENT DOCUMENTS

| | | | | |
|---|---|---|---|---|
| 2006/0219329 | A1* | 10/2006 | Hu | C22F 1/10 |
| | | | | 420/444 |
| 2013/0115091 | A1* | 5/2013 | Bruck | F01D 5/005 |
| | | | | 416/223 R |
| 2015/0352673 | A1* | 12/2015 | Kamel | C22C 19/058 |
| | | | | 428/607 |
| 2015/0367456 | A1* | 12/2015 | Ozbaysal | B23K 35/30 |
| | | | | 419/23 |
| 2017/0197282 | A1* | 7/2017 | Seemann | F01D 5/005 |

FOREIGN PATENT DOCUMENTS

| | | |
|---|---|---|
| DE | 102015122393 A1 | 6/2016 |
| DE | 102015122395 A1 | 6/2017 |

\* cited by examiner

METHOD FOR PRODUCING A JOINING CONNECTION BETWEEN METAL SHEETS

CROSS REFERENCE TO RELATED APPLICATION

This U.S. National Stage Patent Application claims the benefit of PCT International Patent Application Serial No. PCT/EP2021/054947, filed Feb. 26, 2021, entitled "METHOD FOR PRODUCING A JOINING CONNECTION BETWEEN METAL SHEETS" which claims the benefit of and priority to German Patent Application Serial No. DE 10 2020 202 789.7 filed on Mar. 4, 2020, the entire disclosures of which are hereby incorporated by reference.

The present invention relates to a method for producing a joining connection between at least two metal sheets or at least two components made of sheet metal, comprising at least one step in which a connection is produced between the at least two metal sheets or sheet-metal components by hot-press soldering.

PRIOR ART

Today, automobile assembly takes place with the aid of structural mechanics, which comprises the calculation of deformations, forces, and internal stresses in solid bodies, either for planning new mechanical structures or for recalculating existing mechanical structures.

A means often used for calculations in structural mechanics is the finite element method, which results in individual assemblies being improved by connecting metal sheets or individual sheet-metal portions to one another for reinforcement.

One way of connecting at least two metal sheets is by using the tailored welded blank. These are cut-to-measure blanks, with a sheet-metal blank which is typically composed of materials of varying grades and sheet-metal thicknesses. This prefabricated, semi-finished product is subsequently formed, for example, by means of deep-drawing in order to produce the desired component.

In the tailor welded blank (TWB), the individual sheet-metal blanks are welded together. This is generally done as a butt joint by means of laser welding.

FIG. 1 shows a first component 1—a side part blank—by way of example. In the enlarged subregion of the side part blank, a sheet-metal portion—a second component 2—is either spot-welded or connected along a contour 3 using a laser welding method, as shown on the right.

So-called hot-press soldering as a joining method is also known in principle from the prior art. Hot-press soldering is a material thermal joining method for combinations of light metals and steel sheets of the sort used in modern vehicle body construction. Before the actual soldering process, an oxide layer on the component surface is removed by means of pre-soldering the joining partners with the aid of plasma deposition soldering or atmospheric plasma spraying. As a result, compounds of the same type as well as compounds of different types can be produced from high-strength aluminum alloys or magnesium alloys, on the one hand, and galvanized sheet steel on the other. The sheets of aluminum alloys or magnesium alloys and of sheet steel are coated with zinc or a zinc alloy as solder in the region of the joining surfaces by means of plasma spraying. Subsequently, the metal sheets are joined by means of hot-press soldering, but without forming the joining partners.

When using metal sheets made of quenched and tempered steel in vehicle body construction, the use of hot working is required because these materials cannot be formed at room temperature. The use—up until now—of conventional welding as the joining technique to produce a joining connection between hot-stamped components of this kind made of quenched and tempered steel leads to material damage.

In series production, the procedure was merely to hot-work the individual parts and then join them in a separate operation during vehicle body construction.

DE 10 2005 038 493 A1 discloses a method for producing a joining connection between two metal sheets or two components made of sheet metal, wherein the production of the joining connection is simultaneously accompanied by a forming process. As a result, it is already possible to produce the joining connection during the hot-working process, which is required anyway, and the conventional downstream joining process during vehicle body construction can be dispensed with. The method allows for time to be saved during manufacture as well as savings in investment, since, in particular, the number of furnaces or presses required for the hot working can be reduced. By means of a forming process, several components, in particular, can be formed and joined at the same time, such that at least one forming process and one joining process are eliminated. The forming process—in particular, the so-called hot stamping—can be carried out at the same time by means of hot-press soldering of two or more components. The joining connections are produced during the forming process by means of press soldering, wherein additional method steps for producing the joining connection are not required.

DE 10 2015 122 393 A1 discloses a method for producing a composite, semi-finished product using the following method steps: producing an H partner from a material that is stronger compared to a partner blank (L partner), wherein the H blank, on a connecting surface, has surface structures which are suitable for a form fit with an L partner; producing a partner (L partner) from a material that is less strong compared to the H blank; bringing together the H partner and the L partner; connecting the H partner to the L partner by applying a compressive force to a composite, semi-finished product connected at least in a form-fitting or material-bonded manner by pressing at least part of the material of the L partner into the surface structures of the H partner, which are intended for the form-fit with the L partner, in a plastically-flowing manner so as to fill in and produce a form-fit.

DE 10 2005 038 493 A1 discloses a method for producing a joining connection between two metal sheets or two components made of sheet metal, comprising at least one step in which a connection is produced between the at least two metal sheets or sheet-metal components by means of hot-press soldering.

DE102004049825 A1 discloses a method for removing the coating from components. An outer cover zone or build-up zone of the coating is removed by chemical-mechanical means, and an inner diffusion zone of the coating is removed by laser ablation.

The object of the present invention is to provide a method for producing a joining connection between at least two metal sheets or at least two components made of sheet metal that simplifies the manufacturing process and thus enables cost savings in series manufacturing.

The invention is intended to produce a planar connection between the coated, hot-worked metal sheets during the hot-working process that exhibits a higher resistance to failure in the event of loading of the overall component in a crash (due to shear and peel forces). A welding process is to be avoided.

DESCRIPTION OF THE INVENTION

The object is achieved by a method for producing a joining connection between at least two metal sheets or at least two components made of hot-workable sheet metal with a scaling-resistant coating, comprising at least one step in which a connection is produced between the at least two metal sheets or sheet-metal components by hot-press soldering, wherein the surface of the metal sheets or components to be connected is pretreated in order to break up the coating.

The coating is broken up until the sheet metal is exposed.

In addition, the components can also be developed more specifically in terms of shape and material thickness for application in a vehicle, which simultaneously results in a weight reduction.

Furthermore, there is no air gap between the metal sheets, which can cause temperature differences of up to 45° C. due to its effect as an insulator and would thus have a negative effect on the component properties.

The planar connection between two or more coated, hot-worked metal sheets during the hot-working process exhibits a higher load-bearing capacity when the overall component is subjected to shear and peel forces in the event of loading.

It is advantageous if the coating is broken up using a mechanical tool. The coating is broken up by means of stamping forces, and the tool may here be a die.

In order to optimize the process, only the subregion used for the subsequent connection is broken up.

For the connection, a solder—either solder and flux or a brazing solder—is applied in said subregion.

As the next method step, the at least two metal sheets are fixed to one another and then fed to the hot-working process.

It is advantageous that the energy input for the hot working is sufficient for soldering the metal sheets.

DESCRIPTION OF THE FIGURES

The invention is described below by way of example with reference to the attached drawing, in which.

Figure 1:
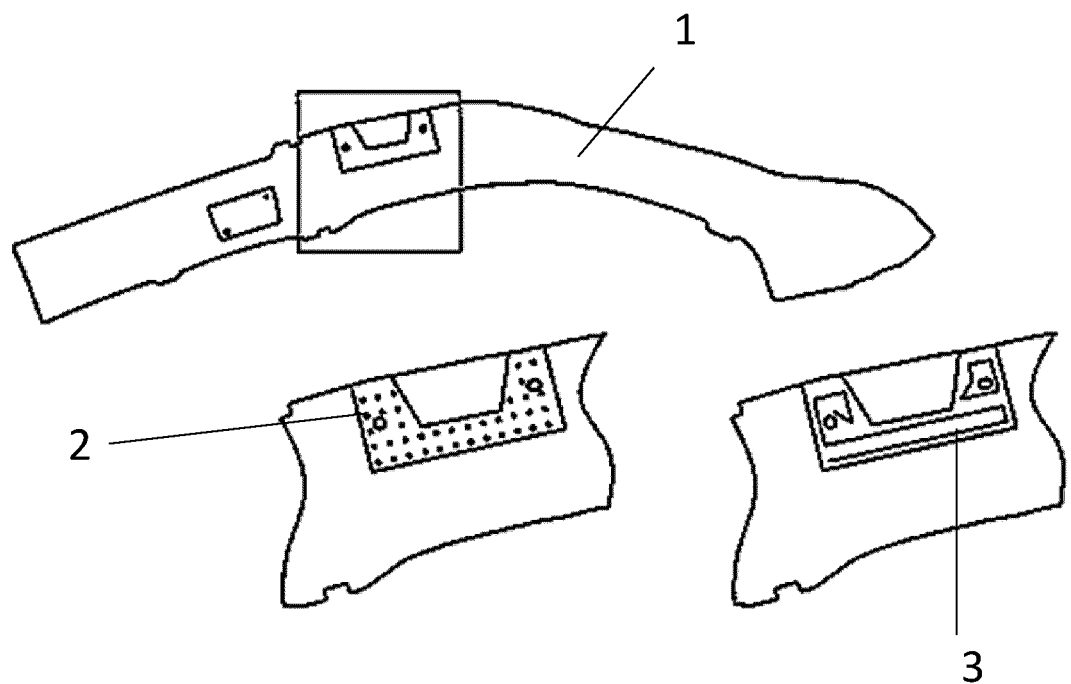
FIG. 1 is a schematic representation of a side part blank in the prior art.

Blanks made of hot-workable steels are provided as the starting material. These materials are a common starting product for lightweight construction.

As a result of the hot working, the required forming forces are low, and springback does not occur, as in the case of the deep-drawing of high-strength and ultra-high-strength steels. For example, a 22MnB5 steel is used both for supporting components and for crash-related components which do not have to withstand significant deformation. Typical applications are therefore components that serve as ingress protection, such as A and B pillars, bumpers, transverse and roof rails, but also center tunnels.

Austenitization is usually carried out in continuous furnaces, but also in induction furnaces or multi-chamber furnaces. The presence of oxygen in the furnace atmosphere leads to scaling and edge decarburization of the semi-finished product. Although the heating can also take place in an inert atmosphere, the oxygen exposure and thus the metal loss occur at the latest during transfer into the press-hardening tool.

This not only leads to a reduction in the tool life, but also to a deterioration in the heat transfer between the part being formed and the tool. Therefore, the metal sheets are frequently provided with a scaling-inhibiting coating. Of the various possible coatings, hot-dip aluminizing, i.e., an aluminum-silicon coating, which was developed first, is at present used most frequently.

For a planar connection, according to the invention, a first component 1 having an AlSi coating is connected to a second component 2 via a brazing solder 5. In preparation, the subregion 1a of the first component 1 is treated using a tool which breaks up the coating 6 in a targeted manner.

Since this break-up takes place shortly before the metal sheets are connected, no problems with oxidation arise.

Figure 2:
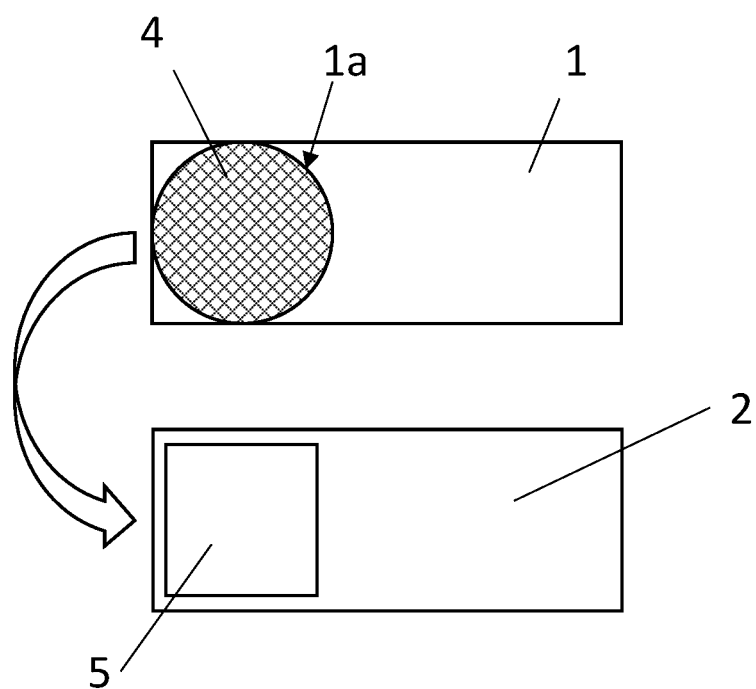
FIG. 2 schematically shows a sheet metal arrangement according to the invention.
Figure 3:
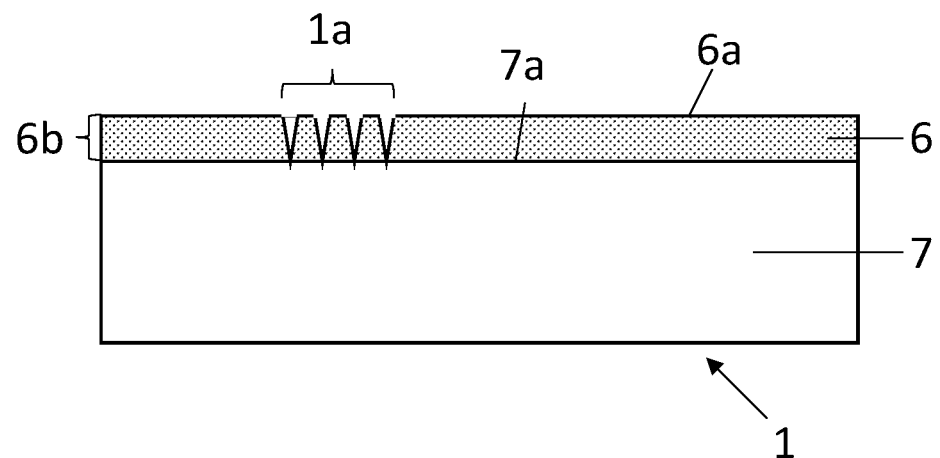
FIG. 3 shows a section through a coated metal sheet.

For example, a die is used which mechanically perforates the surface 6a of the coating in the subregion 1a of the connection. FIG. 2 shows this as a wafer pattern 4. In the example, a circular impression can be seen, but other contours are also possible. Due to the perforation, the AlSi surface is broken up in a targeted manner in order to create an optimal connection between the steel, aluminum, and solder.

This means that the grooves and channels formed in the coating 6 extend down to the surface 7a of the steel blank 7. The depth corresponds to the thickness 6b of the coating 6. Subsequently, the brazing solder 5 is applied to the subregion 1. The brazing solder 5 may also be replaced with another solder material and a flux.

The second component is likewise prepared as described above.

Subsequently, the two components 1 and 2 are fixed and fed to the hot-working process in order to form the sheet stack. The hot-working process provides the temperature required for the planar connection. Subsequently, the sheet stack is mechanically formed in the press in the hot-working tool and cooled.

The method can be used for all hot-working steels, examples being USI-BOR or DUCTIBOR. The coating is, advantageously, AlSi, but may also be a different coating.

The break-up of the coating occurs on all components which are to be connected to one another.

As an alternative to the mechanical break-up of the coating, a laser tool may be used to break up the coating using the laser beam.

The AlSi coating is perforated in a punctiform manner by means of the laser, wherein a region 1a in which the solder connection is to be produced is preselected in this case, too. The distances between the perforations can vary as required. The perforations allow for punctiform exposure of the steel blank, with local removal of the AlSi coating down to the surface 7a of the steel blank. By adjusting the laser power, the penetration depth is defined, and the material of the coating 6 having the thickness 6b can be removed easily and very precisely down to the surface 7a.

Figure 5:
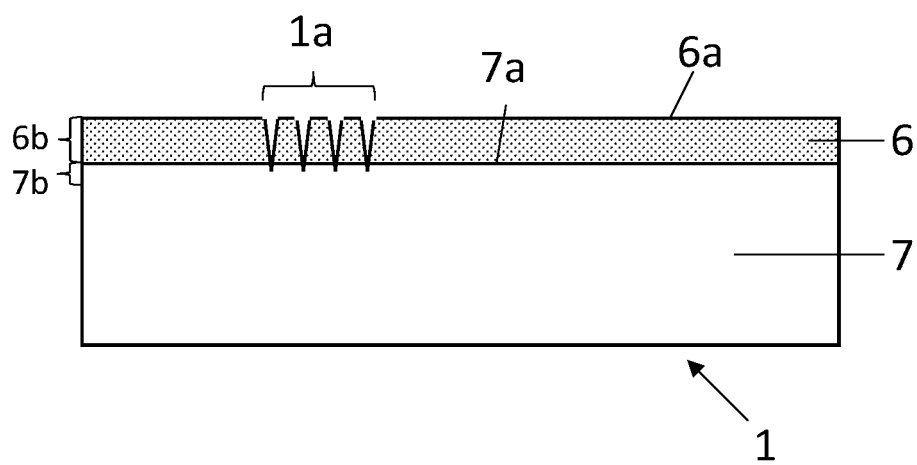
FIG. 5 shows a section through a coated metal sheet with ablated regions.

In another embodiment, the surface 7a of the steel blank 7 is also roughened, as is shown in FIG. 5, in addition to the removal of the coating 6. Here, the laser power is set such that the laser, in addition to the thickness 6a of the coating, also removes material from the steel blank 7 to the depth 7b.

Figure 4:
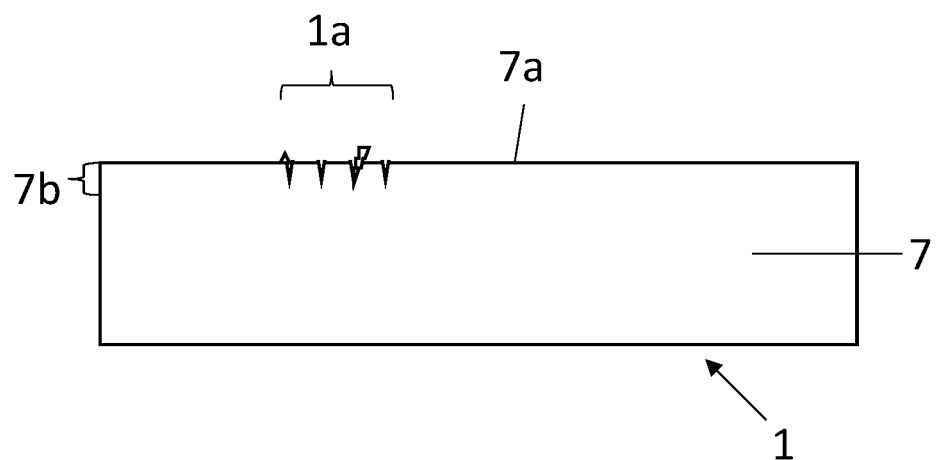
FIG. 4 shows a section through an uncoated metal sheet with a roughened surface.

In another embodiment, the surface 7a of an uncoated steel blank 7 is provided with peaks and troughs in the subregion 1a by means of a separate laser pulse method. As a result, the surface 7a acquires a very rough character. As indicated in FIG. 4, the surface 7a has indentations, and thus constitutes a good connection surface.

By means of the connection method according to the invention, coated metal sheets can therefore be connected to one another or to an uncoated metal sheet.

Depending upon the demands made of the connection, the pretreatment of the metal sheets in subregion 1a, which is used for the connection, is performed on the coating surface 6a, on the steel blank surface 7a, or on both.

The invention claimed is:

1. A method for connecting two components made of hot-workable sheet metal, wherein at least one of the components is provided with a scaling-resistant coating on a metal surface, wherein at least one of the components which includes the coating is pretreated in order to form grooves and/or channels in the coating, wherein the grooves and/or channels in the coating extend the entire thickness of the coating down to the metal surface of the component, applying solder to the grooves and/or channels in the coating, and joining the two components with the solder applied to the grooves and/or channels.

2. The method according to claim 1, wherein the grooves and/or channels of the coating are formed using a mechanical tool.

3. The method according to claim 2, wherein the tool is a die.

4. The method according to claim 1, wherein the grooves and/or channels in the coating are formed using a laser.

5. The method according to claim 1, wherein the coating is broken up only in a subregion which includes the grooves and/or channels and is used for the subsequent connection.

6. The method according to claim 1, wherein the solder is combined with a flux to form the connection.

7. The method according to claim 1, wherein the components are fixed to one another by the solder and are then fed to a hot-working process.

8. The method according to claim 1, wherein energy input for hot working the components is sufficient for soldering the components.

9. The method according to claim 1, wherein the pretreatment of the at least one component roughens the metal surface of the component in a subregion including the grooves and/or channels in the coating.

* * * * *